(12) United States Patent
Estève (10) Patent No.: US 9,058,071 B2
(45) Date of Patent: Jun. 16, 2015

(54) METHOD FOR DETECTING A SUSTAINED CONTACT AND CORRESPONDING DEVICE

(75) Inventor: Simon Estève, Rambouillet (FR)

(73) Assignee: Elo Touch Solutions, Inc., Menlo Park, CA (US)

( * ) Notice: Subject to any disclaimer, the term of this patent is extended or adjusted under 35 U.S.C. 154(b) by 277 days.

(21) Appl. No.: 13/581,517

(22) PCT Filed: Mar. 17, 2011

(86) PCT No.: PCT/EP2011/001336
§ 371 (c)(1),
(2), (4) Date: Nov. 29, 2012

(87) PCT Pub. No.: WO2011/120636
PCT Pub. Date: Oct. 6, 2011

(65) Prior Publication Data
US 2013/0069916 A1    Mar. 21, 2013

(30) Foreign Application Priority Data
Mar. 29, 2010  (EP) .................................... 10290164

(51) Int. Cl.
*G06F 3/041*   (2006.01)
*G06F 3/043*   (2006.01)

(52) U.S. Cl.
CPC .............. *G06F 3/041* (2013.01); *G06F 3/0436* (2013.01)

(58) Field of Classification Search
CPC ...... G06F 3/043; G06F 3/0433; G06F 3/0436
USPC ......... 345/173–179; 178/18.04, 18.01–18.07, 178/19.01–19.06, 20.01–20.04
See application file for complete search history.

(56) References Cited

U.S. PATENT DOCUMENTS 7,157,649 B2    1/2007  Hill
2003/0063073 A1   4/2003  Geaghan et al.
(Continued)

FOREIGN PATENT DOCUMENTS

CN    1596412 A    3/2005
CN    1914585 A    2/2007
(Continued)

OTHER PUBLICATIONS

International Search Report for Application No. PCT/EP2011/001336, dated May 5, 2011.
(Continued)

*Primary Examiner* — Kent Chang
*Assistant Examiner* — Nelson Rosario
(74) *Attorney, Agent, or Firm* — Alston & Bird LLP (57) ABSTRACT

The invention relates to a method for determining the location and duration of a sustained contact of a touch event performed by a user on a surface of an object comprising the steps of: a) determining the location of the touch event, in particular based on an acoustic signal generated by the impact of the touch on the surface, and b) determining the duration of the touch event based on a perturbation of a signal generated in or on the object by a transducer characterized in that step b) comprises analyzing the signal generated at or close to N natural frequencies of the object, with N being one or more. The analysis close to the natural frequencies allows the reliable determination of not only the location of a touch event but also whether the user continues to interact with the surface of the object which is due to the important damping of the generated signal in the presence of the touch. The invention also relates to a touch sensitive device configured to carry out the method.

23 Claims, 8 Drawing Sheets

(56) References Cited

U.S. PATENT DOCUMENTS

| | | | |
|---|---|---|---|
| 2005/0146512 A1 | 7/2005 | Hill et al. | |
| 2006/0279548 A1* | 12/2006 | Geaghan | 345/173 |
| 2009/0195518 A1 | 8/2009 | Mattice | |
| 2009/0273583 A1 | 11/2009 | Norhammar | |
| 2010/0117993 A1* | 5/2010 | Kent | 345/177 |
| 2014/0204059 A1 | 7/2014 | Geaghan | |

FOREIGN PATENT DOCUMENTS

| | | |
|---|---|---|
| CN | 101194221 A | 6/2008 |
| EP | 1512116 | 3/2005 |
| TW | I264676 B | 10/2006 |
| WO | WO-2005/066755 | 7/2005 |
| WO | WO-2006/039033 | 4/2006 |
| WO | WO 2006/039033 A2 | 4/2006 |
| WO | WO-2006/133018 | 12/2006 |
| WO | WO 2006/133018 A2 | 12/2006 |

OTHER PUBLICATIONS

Search Report from European Application No. 10 29 0164 dated Aug. 30, 2010.
Liu, Yuan; Thesis—The National Graduate School of the Arts and Crafts; "Tactile Process Based on Ultrasonic Diffraction"; Institute of Science and Technology, Paris Institute of Technology; Dec. 15, 2010; Cover Sheet and p. 9.
Liu, Y., J. P. Nikolovski, M. Hafez, N. Mechbal, and M. Vergé; "Thin Finite Plate Modeling and Experimentation of Lamb Wave Propagation at Various Boundary Conditions", proceeding of the Eurosensors XXII conference, Dresden, Germany, 2008.
Liu, Y., J. P. Nikolovski, M. Hafez, N. Mechbal, and M. Vergé; "A Multi-Touch Plate Based on Lamb Wave Absorption", Procedia Chemistry 2009 1(1):156-159.
Liu, Y., J. P. Nikolovski, M. Hafez, N. Mechbal, and M. Vergé; "Acoustic wave approach for multi-touch tactile sensing", Proceeding of International Symposium on Micro-NanoMechatronics and Human Science, MHS 2009, Nagoya Japan, 2009.
Liu, Y., J. P. Nikolovski, M. Hafez, N. Mechbal, and M. Vergé; "Tactile objects based on an amplitude disturbed diffraction pattern method", Applied Physics Letters; 2009 95(25) 251904.
Liu, Y., J. P. Nikolovski, M. Hafez, N. Mechbal, and M. Vergé; "An acoustic multi-touch sensing method using amplitude disturbed ultrasonic wave diffraction patterns", Sensors & Actuators: A. Physical; 2010;162(2):394-399.
Written Opinion from International Application No. PCT/EP2011/001336, dated May 12, 2011.
Office Action from Taiwanese Patent Application No. 100110444, dated Sep. 24, 2014.
Office Action from Chinese Patent Application No. 201180025253.9 dated Dec. 31, 2014.

* cited by examiner

METHOD FOR DETECTING A SUSTAINED CONTACT AND CORRESPONDING DEVICE

CROSS-REFERENCE TO RELATED APPLICATION

This application is a national stage application filed under 35 U.S.C. 371 of International Application No.PCT/EP2011/001136 filed Mar. 17,2011, which claims priority from European Application No. 10290164.2, filed Mar.29,2010, each of which is incorporated by reference herein in its entirety.

The invention relates to a method for determining the location and duration of a sustained contact—also called hold action—of a touch event performed by a user on a surface of an object using the analysis of acoustic signals and to a device configured to carry out such a method.

Touch sensitive devices using acoustic signals to determine the position of an impact on a tactilized surface of the device are based on the analysis of the propagation of bending wave in the device when the user touches it. By creating vibrations in the object whether by impact or friction, like during a drag action, the user actually generates the vibration signals used for the localization of the touch event. EP 1512116 A1 describes a method to localize the position of an impact using acoustic signals.

The described acoustic method has, however, the drawback that once the acoustic signal is no longer present, the method can no longer discriminate a state during which the user still touches the surfaces, also called hold action which is comparable to a continuous computer mouse click, and a state in which the user no longer touches the surface. Indeed, during the hold action, no vibrations and thus bending waves are created. The hold action is, however, an important feature for touch sensitive surfaces, as in today's common user interfaces, the "click down" feature is commonly used. In addition, this "hold" feature is inherently present in other touch technologies such as capacitive, surface acoustic wave, or resistive.

WO2006/039033 proposes to identify single hold actions based on a measurement of a touch plate displacement or touch plate bending or a measurement whether low frequency signals which can arise due to presence of a finger on the interaction surface are present or not. WO 2005/0066755 proposes to induce a bending wave signal and to compare it to an untouched condition signal using an adaptive filtering process using filter coefficients that cancel the bending wave signal. In the system used in WO2005/0066755 the user interface needs to be arranged such that any signal reflections can be prevented. It appeared, however, that the proposed processes either cannot reliably detect the sustained contact or their implementation is burdensome in particular to systems where signal reflections need to be suppressed. In addition, the process using the induced bending waves signal is rather energy consuming which makes it impossible to use in battery run devices, like mobile phones etc.

It is therefore the object of the present invention to provide an improved method to determine the location of a touch event based on acoustic signals, which is also capable to reliably determine the duration of a sustained contact, to enable a touch and hold functionality. It is a second object of this invention to extend the touch and hold functionality to multi touch and hold situations in which a sustained interaction between the user and the user interface occurs for more than one location at the same time.

This object is achieved with the method according to claim 1. The inventive method for determining the location and duration of a sustained contact of a touch event performed by a user on a surface of an object comprises the steps of: a) determining the location of the touch event, in particular based on an acoustic signal generated by the impact of the touch on the surface, and b) determining the duration of the touch event based on a perturbation of a signal generated in or on the object by a transducer and is characterized in that step b) comprises analyzing the signal generated at or close to N natural frequencies of the object, with N being one or more.

Thus, the inventive method couples the passive acoustic technology with an active acoustic technology and takes advantage of the use of natural frequencies of the object for the active acoustic part. In this context the term "natural frequency" relates to the natural frequencies of the object in the absence of any other element, e.g. a finger or stylus, touching the object. The principle is to use an exciter to generate bending waves in the object which are sensed by the passive sensors. As the frequencies used are at or close to natural frequencies of the object, the amplitudes of the generated signals can be rather high so that the power necessary to generate exploitable signals can be kept low which keeps energy consumption low and furthermore any change in the boundary conditions of the object, e.g. the presence of a finger or stylus on the surface of the object will immediately create a perturbation of the signals, as the resonant condition at the natural frequencies is no longer met. The perturbation can be easily detected so that a reliable and low energy requiring hold detection solution is provided.

The use of more than one natural frequency in the generated signal has the additional advantage that non homogeneity in the amplitude distribution over the surface of the object can be averaged out, thereby further improving the method.

Finally, using natural frequencies one is no longer limited to user interfaces setup to suppress signal reflections.

The term "close to" here meaning within typically 1% off the natural frequency, thus in the range of acoustic signals above 20 kHz this represent about 100 to 300 Hz.

Preferably, step a) can comprise a coarse location determination step based on the perturbation of the signal generated in or on the object and a fine location determination step based on the acoustic signal generated by the touch event. The perturbed signal not only carries information about the presence or absence of a finger or stylus on the object, but can also carry some information about the location of the impact.

Further preferred, during the coarse location determining step a candidate area smaller than the interaction surface can be determined within which the touch event took place and wherein during the fine location determination step the location of the touch event is determined within the candidate area.

To do so, changes, in particular ratios, of properties of the perturbed signals, which are dependent on the location of the impact with respect to the sensing means used to sense the perturbed signals, are exploited. Then the precise impact localization determination step can be carried out within the candidate region. Thus, the calculation power necessary to identify the touch location can be reduced.

The second object of the invention is achieved with the method according to claim 4 and relates to a method for determining the locations and durations of two or more sustained contacts of a touch events performed by a user on a surface of an object, wherein the two or more sustained contacts at least partially overlap in time, comprising the steps of: determining the location of the touch events based on acoustic signals generated by the impacts of the touch on the surface, and b) determining the duration of each one of the sustained touch events based on the analysis of a signal of a second kind, wherein the end of one of the two or more sustained touch events is determined based on the identification of a change observed in at least one parameter of the signal of the second kind. The acoustic technology based on bending waves can be extended to multi touch situations and using a second kind of signal the sustained contact can be determined, e.g. based on the sensing of a perturbed signal generated in or on the surface of the object using a transducer, like described above. In case one of the sustained contacts ends before the other a change in the perturbed signal will be observed. This change can be used to identify the end of one impact and thus serves in the analysis of multi touch and hold events.

According to a further preferred embodiment, step b) of the method according to claim 4 can comprise the coarse determination step as already described to determine which one of the touch events has ended. Indeed, if the user touches the surface of the object with two fingers and removes one before the other, a change of properties of the perturbed signals indicates the lift off of one of the fingers and the properties of the signal sensed thereafter can be used to determine the location of the remaining finger. Thus the process can be used to identify multi touch and hold events.

According to a preferred embodiment, different frequencies can be analyzed in step a) and b). This simplifies the signal analysis.

Preferably, the N frequencies used in step b) for analyzing can be outside the audible frequency range, in particular at frequencies at or above 20 kHz. In this case the generated signal used to determine the presence of a sustained contact or hold event, is not audible and therefore does not disturb the user.

Even further preferred, the acoustic signal and the perturbed signal can be sensed by the same sensing means. The signals can then be separated in an analyzing means based on their frequency properties. This simplifies the structure of the touch sensitive object.

Advantageously, the method can further comprise a calibration step, comprising sweeping through the frequency band which can be provided by the transducer, and identifying the N frequencies used in step b) by identifying the N largest signal amplitudes sensed by a sensing means. Using the calibration step, the best suited frequency candidates can be found in an automated manner without needing detailed knowledge about the properties of the object itself. The identification of N extreme values is sufficient.

Further preferred, the N frequencies used in step b) can be separated by at least three times the frequency step used in the frequency sweep of the calibration. The frequency step in the sweeping phase depends on the amount of damping present in the panel. The more damping there is, the larger this frequency step can be. By only choosing frequencies for the analysis that are sufficiently separated a cross talk between them can be prevented to thereby further improve the reliability of analysis.

According to a preferred embodiment, the invention can further comprise a recalibration step, in particular carried out on a regular basis or upon user request, comprising sweeping through the frequency band which can be provided by the transducer, and adapting the N frequencies to be used in step b), in particular in case a frequency shift has been observed. Thus the N frequencies used for the analysis can be adapted to changing situation, in particular in case of a deterioration of the properties of the interaction surface of the object, like scratches, dirt etc.

Preferably, the calibration and/or recalibration step can further comprise the steps of: determining at the N natural frequencies, a mean value and a standard deviation of the amplitude values and/or the phase differences and/or inter sensed signal properties; and determining a minimum threshold value and a maximum threshold value for each corresponding frequency or a combination thereof. For instance, in the calibration phase a reference vector of N amplitudes and/or phases and/or inter sensed signal properties can be built up. Then the N amplitudes and/or phase differences and/or inter sensed signal properties of the incoming perturbed signal can be compared to the reference vector, e.g. by doing a correlation operation which then gives a resemblance score or correlation level. When this score is lower than a given threshold then a touch event occurs. When the score comes back above a given threshold then the touch event is terminated.

Advantageously, in step b), it can be decided that a touch action still occurs as long as at least one signal amplitude or phase or inter sensed signal property of the N frequencies is outside the amplitudes and/or phase differences and/or inter sensed signal properties range defined by the corresponding minimum and maximum threshold values respectively. Thus without complex data analysis a simple but reliable criterion to decide whether the touch event continues or is stopped by the user can be provided.

Preferably, step b) can further comprise determining a confidence level based on the number of amplitudes or phase or inter signal properties that is/are outside the amplitudes and/or phase differences and/or inter sensed signal properties range. Thus the method can be simply adapted to the needs of a user.

The object of the invention is also achieved with the method according to claim 14 which also relates to a method for determining the location and duration of a sustained contact of a touch event performed by a user on a surface of an object, in particular according to the method and its variations as described above, comprising the steps of: a) determining the location of the touch event, in particular based on an acoustic signal generated by the impact of the touch on the surface, and b) determining the duration of the touch event based on a perturbation of a signal generated in or on the object by a transducer and characterized in that step b) comprises sensing the generated signal and analyzing variations in the sensed signal. It is the finding of this invention that the signals' variations, like for instance the standard deviation of the signal, close to natural frequencies or not, is a suitable measure to identify whether the touch event continues or not. A person interacting with the surface of the object actually cannot keep the precise location of the touch event over the entire duration of the interaction with the surface, but the finger or stylus held by the user oscillates around the touch location, but also leads to pressure variations which are higher than the variations of the signal in an untouched situation. Thus by simply analyzing signal variations, the inventive method can reliably detect the presence of a sustained touch event.

Preferably, in step b), the end of a touch event can be detected in case the variations of the sensed signal are below a predetermined threshold.

According to a preferred embodiment, the variations in the sensed signal can be analyzed at or close to at least one frequency component at or close to a natural frequency of the object. Thus again advantage is taken from the fact that in the presence of a finger or a stylus, the resonant signals are rapidly damped so that the presence of a sustained contact can be reliably established.

The invention also relates to a computer program product, comprising one or more computer readable media having computer-executable instructions for performing the steps of one of the methods described above or a combination thereof.

The object of the invention is also achieved with the touch sensitive device according to claim 18, in particular configured to carry out the method as described above, comprising one touch location determining unit and one touch duration determining unit, wherein the touch location determining unit comprises a first sensing means for receiving an acoustic signal generated by the impact of the touch on the surface of the object and a localization unit for determining the location of the touch based on the acoustic signal, and the touch duration determining unit comprises a transducer for generating a signal at or close to N natural frequencies of the object, with N being one or more, a second sensing means for receiving the generated signal and a duration determining unit for determining the duration of the touch based on a perturbation of the signal generated in or on the object by a transducer. With this touch sensitive device, all the effects and advantages like already described above with respect to the method and its variations can be achieved.

Preferably, the first and the second sensing means can share the same sensors and a filtering unit is used to attribute the signals to the localization unit and the duration determining unit based on different frequencies used for the determining the localization and the duration of the touch event. This simplifies the structure of the device and at the same time a hold action and its end can be reliably identified.

Preferred embodiments of the invention will be described in detail with respect to the enclosed figures.

Figure 1:
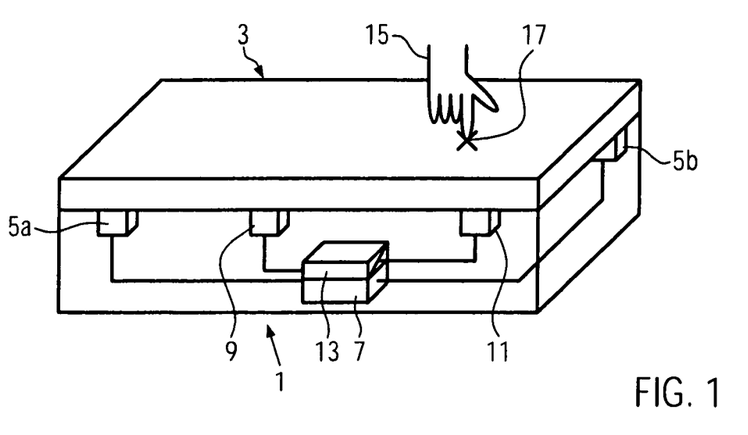
FIG. 1 illustrates schematically a touch sensitive device according to the invention

FIG. 1 illustrates schematically a touch sensitive device 1, e.g. a handheld mobile device like a mobile phone, a mp3 player, a pda, a laptop, or any other electronic device comprising a user interface 3 for inputting instructions. According to the invention, the user interface 3 is a touch sensitive surface of the device 1, wherein touch localization is achieved using an acoustic technology. Any touch event of a user, e.g. a tap or a sliding/dragging action, which can be a single or a multi-touch touch event, creates a bending wave inside the user interface 3. The acoustic signal created is sensed by first sensing means, in this embodiment acoustic transducers 5a, 5b, like a piezo-electric transducer, transforming the acoustic signals into electric signals which are then analyzed by a localization unit 7 for determining the location of the touch based on the acoustic signal. The first sensing means 5 and the localization unit 7 form the touch localization determining unit according to the invention. More than two transducers or even only one could be used to sense the signal. The user interface 3 can be made of any material, as long as acoustic signals can travel therein.

The touch sensitive device 1, in addition, comprises a touch duration determining unit comprising a transducer 9 for generating a signal, e.g. a piezo-electric transducer, a second sensing means 11, like a piezo-electric transducer for receiving the generated signal and a duration determining unit 13 for determining the duration of the touch a user based on a perturbation of the signal generated in or on the object by a transducer. In the illustrated embodiment, only one second sensing means is shown, however more than one sensor could be used, like for the touch localization determining unit.

Both the localization unit 7 and the determining unit 13 comprise a signal filtering and condition unit.

The inventive touch sensitive device 1 comprises the additional touch duration determining unit 13 to take into account the fact that upon the impact between a finger or stylus 15 of a user on the user interface 3, the acoustic signal travelling through the interaction surface towards the first sensing means 5a, 5b can be used to identify the location 17 of the impact, but that during a continuous or holding touch action of the user, no further acoustic waves are generated by the user's touch itself, so that it becomes difficult to discriminate between a simple and short touch event and a touch-hold event. However, both actions are implemented in standard user interfaces and different functionalities or actions can be attributed to the two events.

Embodiments of the method for determining the location 17 and the duration of a sustained contact of a touch event performed by a user on the user interface 3 will be described in the following figures. For illustrative purposes, the method is implemented into the touch sensitive device 1 according to the invention illustrated in FIG. 1. Other touch sensitive device can, however, also implement the methods as described below.

Figure 2:
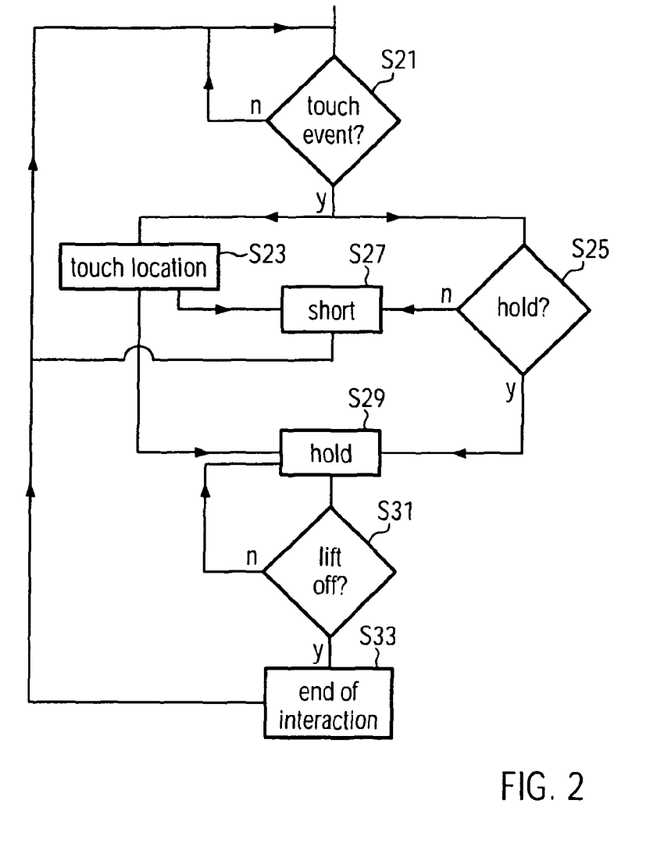
FIG. 2 illustrates a first embodiment of the inventive method to determine the location and duration of a sustained touch event.

FIG. 2 illustrates a first embodiment of the method according to the invention. The invention uses a two step approach to determine the location and duration of the touch event based on the analysis of a signal created by the user when touching the interaction surface of the user interface 3 (passive signal) and based on the analysis of signal properties of a signal generated by the transducer 9 (active signal).

The first embodiment of the method according to the invention and as illustrated in FIG. 2 comprises the following process steps:

In Step 21, the signals captured by the first sensing means 5a, 5b and/or the second sensing means 11 are analysed to check whether a touch event, e.g. an impact by a finger or a stylus 15 from a user, occurred or not. This step S21 is repeated until a touch event has been detected.

In the presence of a touch event, the process proceeds with Step 23 which consists in determining the location 17 of the touch event on the user interface 3. The location 17 is determined based on the acoustic signal generated by the impact of the touch on the user interface 3. The impact of the touch on the user interface 3 creates acoustic bending waves inside the material of the user interface 3. The bending waves travel through the material and are sensed by the first sensing means 5a, 5b of the touch sensitive device 1. Based on a process like for instance described in EP 1 512 116 A1, the coordinates of the location 17 of the impact are then determined by the localization unit 7.

In parallel, Step 25 consists in deciding whether or not the touch event relates to a sustained contact during which the user keeps his finger 15 or the stylus on the user interface 3 or not.

According to the invention, this decision is made by analysing a signal generated by the transducer 9 which is sensed by the second sensing means 11 and analyzed by the duration determining unit 13, thus not using the bending waves created by the impact on the interaction surface itself.

If, in Step 25, it is decided that the touch event does not relate to sustained contact, the duration determining unit 13 decides that a short contact comparable to a click action on a computer mouse or the hitting of a key on the keyboard occurred and provides a corresponding output (Step 27) and the process restarts with Step 21.

If, in Step 25, it is decided that the touch event relates to a sustained contact, the touch event is identified as a hold action and a corresponding output (Step 29) is provided by the duration determining unit 13. The subsequent Step 31 then serves to identify to end of the hold action (lift-off) by again analysing the signal generated by the transducer 9 and sensed by the second sensing means 11.

In case a lift-off has been determined in Step 31, the user interaction with the user interface 3 has ended a corresponding output is provided by the duration determining unit 13 (Step 33) and the process restarts with Step 21.

The solution proposed by the invention is thus to couple a passive acoustic technology used to determine the touch location with an active acoustic technology used to determine the duration of the touch event.

To do so, in Step 25, a bending wave with known parameters—frequency, amplitude, phase—is generated by transducer 9. To determine whether a sustained contact is present or not, the duration determining unit 13 is configured to identify perturbations in the signals sensed by the second sensing means 11 compared to a situation without user interaction.

To be able to reliably detect a sustained contact without needing extensive computational power, the invention proposes to analyse the generated signal at or close to N natural frequencies of the touch sensitive device 1 and/or its user interface 3. The term "Natural frequencies" relates to a situation in which reflections of bending waves in the device occur such that the device resonates under the presence of an outside signal with a given frequency introduced by transducer 9 and this in a situation without user interaction.

To identify the natural frequencies of the device 1 and/or the user interface 3, a calibration step is carried out during which the frequency band, which can be provided by the transducer 9, is swept through and the signals sensed by the second sensing means 11 are then analysed by the duration determining unit 13 to identify the frequencies with the N largest amplitudes.

The number of frequency steps used in the sweeping phase typically depends on the amount of damping present in the device 1. The more damping there is, the larger the frequency step can be. In the frequency band, which can be provided by the transducer 9, the sweeping frequency step is also decided about by the calculation capacity available. In practice, a sampling frequency of around 100 kHz and a number of samples of the order of 512, 1024 or 2048 is used which leads to a frequency step of 192, 96, 48 Hz respectively To prevent an interaction of the actively generated signal of the transducer 9 with the signals generated by the impact of the touch event, natural frequencies which are outside the audible frequency range, in particular at a frequency at or above 20 kHz, are chosen.

To choose different frequency ranges furthermore has the advantage that both the acoustic signal generated by the impact as well as the signal generated by the transducer 9 can be sensed by the same physical sensors which can therefore act both as first and second sensing means.

Furthermore, resonant frequencies are chosen which are separated by at least three times the frequency step used in the frequency sweep to prevent choosing one natural frequency which is smeared across two adjacent frequency bins.

The duration determining unit 13 is further more configured to identify at each of the N frequencies at least one of the following parameters: signal amplitude, phase differences, sensed between the phase of the signals sensed by the sensing means 11 and the phase of the generated signal or phase differences between the phases of the signals sensed, in case of a plurality of second sensing means 11 are used, or values of intra-sensed signal properties of the signals sensed by the plurality of second sensing means, in particular intra-spectral properties $y1 \times y2^*$ or transfer functions $y2/y1$, where $y1$ and $y2$ are the signals sensed by a first and a second sensing means 11 and $y2^*$ corresponds to the complex conjugate of $y2$.

In case of the parameter "phase difference", it should be noted that the sensistivity can be imporved in case the parameter is analysed in the vicinity of the corresponding resonant frequency. typically in a range of plus/minus half the half power bandwidth off the resonant frequency. The half power bandwidth corresponds to those frequncies for which the siganl power is at least half the resonant maximal signal power arond the resonant frequency, also corresponding to the frequency values obtained by looking at the resoant amplitdue dvided by square root of two (or 3 dB in Loq scale).

Furthermore, during the calibration, a mean value and a standard deviation of the amplitude values of the signal amplitudes and/or the phase differences and/or the intra-sensed signal properties are determined and a minimum and/or maximum threshold value can be fixed for the corresponding signal parameter.

Figure 3A:
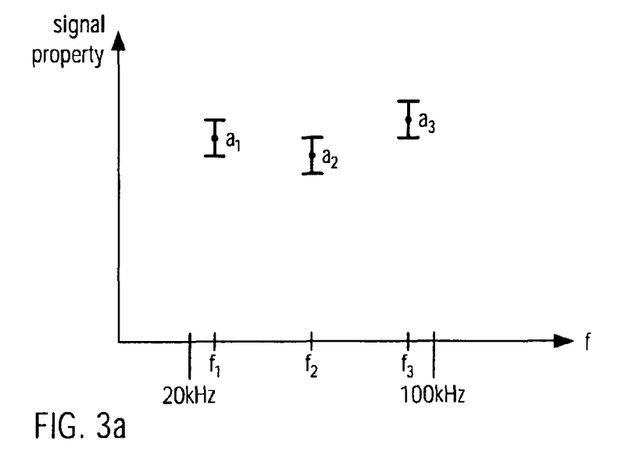
FIG. 3a illustrates the identification of natural frequencies in the calibration phase.

This situation is illustrated in FIG. 3*a*, illustrating three resonant frequencies f1, f2 and f3 which have been identified in the frequency range from 20 kHz to 100 kHz. For each natural frequency f1, f2 and f3, the signal properties a1, a2, and a3, as well as the corresponding standard deviation, are illustrated. Instead of using three frequencies it is of course also possible to realize the invention using only one, two or even more than three natural frequencies.

The duration determining unit 13 is configured to decide that a sustained contact is present when, for at least one of the natural frequencies, f1, f2, f3 the corresponding parameter is outside the parameter range defined by the upper and lower thresholds. Actually, the user touching the user interface 3 will add damping to the signal generated by the transducer 9, so that the amplitude of the signal sensed by the second sensing means 11 will fall out of the range. The invention takes advantage of the fact that close to natural frequencies, the sensitivity to a perturbing factor is large. Thus, the method will be able to detect the hold interaction, even in case the user touches the user interface 3 with his nail or a plastic or metallic tool, for which the damping is much lower than compared to bare human skin.

The presence of the finger or stylus on the user interface, however, not only damps the signal, but also changes the phase or even shifts the natural frequencies of the system. As a consequence, there are also situations in which for example due to the discrete frequency steps used in the calibration, or the change in the resonant pattern on the interaction surface 3, the presence of the finger or the stylus will actually lead to the observation of an even larger amplitude compared to the one during calibration.

Figure 3B:
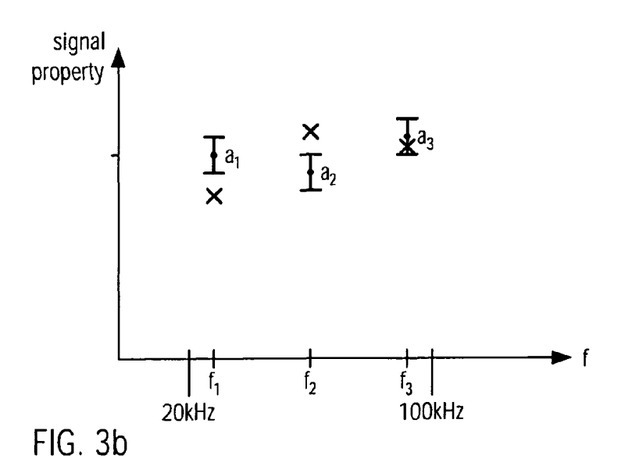
FIG. 3b illustrates the influence of a touch event on the parameters.

The described situation is illustrated in FIG. 3b. Whereas for frequency f1 the property observed is below the lower threshold, the one observed for frequency f2 is larger. For frequency f3, the property it is still inside the corresponding range. This could be for instance due to the fact that the position of the impact is weakly coupled to the resonant bending wave pattern such as a vibration node, at that particular frequency. Thus, looking at a plurality of natural frequencies has furthermore the effect that situations in which the location of the sustained touch event corresponds to a vibration node of the signal at a natural frequency, which would falsely indicate that no interaction occurs, can be excluded by looking at other resonant frequencies. Thus, the reliability of the system can be further improved when more than one natural frequency is analyzed.

The number of frequencies for which the sensed signal is lying outside the predetermined frequency range for the natural frequencies can also be used to create a confidence level. In the present case this would be two out of three.

In Step 31, during which it is decided whether a lift-off has occurred, one takes advantage that, in case the user removes his finger or the stylus, the signal generated by the transducer 9 will again show properties that lie within the ranges determined during the calibration step.

Instead of looking at the individual frequencies f1, f2 or f3 one can also create in this calibration phase a reference vector of N amplitudes and/or phase differences and/or inter sensed signal properties. Then, the N amplitudes or/and phases differences and/or inter send signal properties of the sensed disturbed signal are compared to the reference vector by doing a correlation operation which gives a resemblance score (correlation level). When this score is lower than a given threshold a touch event occurs. When the score comes back above a given threshold then the touch event is terminated (lift-off).

The calibration steps as described above can be carried out on a regular basis or on demand to take in to account changes in the properties of the touch sensitive device 1 or the user interface 3, e.g. due to ageing, accumulation dirt etc.

Figure 4:
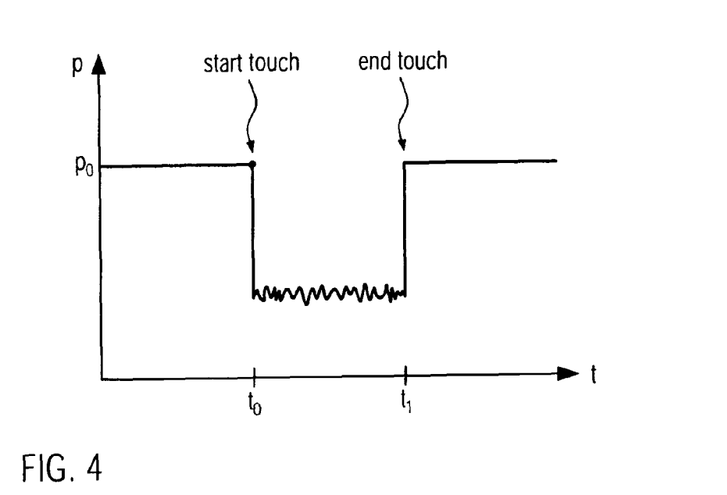
FIG. 4 illustrates an alternative way of detecting the hold and lift-off.

FIG. 4 illustrates an alternative way of detecting the hold and lift-off which can be combined with the one as illustrated in FIGS. 3a and 3b or used alone.

FIG. 4 illustrates the properties of one signal parameter P, e.g. amplitude, phase differences or inter-signal property, of a signal generated by the transducer 9 as a function of time. After that a touch event has been detected at instant t0 in step S21, e.g. using a signal as illustrated in FIG. 4, or using the signals sensed by the first sensing means 5a and 5b, the duration of a sustained touch event according to this alternative, can be determined by looking at the variations of the signal sensed by the second sensing means 11.

As illustrated in FIG. 4, before the beginning of the touch at instant t0, the fluctuations of the signals sensed by the second sensing means 11 are very small. The resonant condition is rather stable.

Then, between t0 and t1, t1 corresponding to the end of the touch the signal variations observed are larger. This effect can be attributed to the natural movements of a person's finger which cannot be suppressed and which translate into signal variations sensed by the second sensing means 11.

At the moment of moving away from the user interface 3, not only the parameter of the sensed signal moves back to its initial value $P_0$, but also the variations of the parameter are again lower so that, by looking the standard deviations or similar properties of the analyzed parameter, it also becomes also possible to detect the presence or absence of the finger on the user interface 3 and, accordingly whether the touch event relates to a sustained touch event or not and how long it took place.

In this alternative, frequencies can be used that are not necessarily corresponding to a natural frequency of the device 1. Still, using the natural frequency represents the advantage that the sensitivity to interactions with a user is greatly enhanced.

Figure 5A:
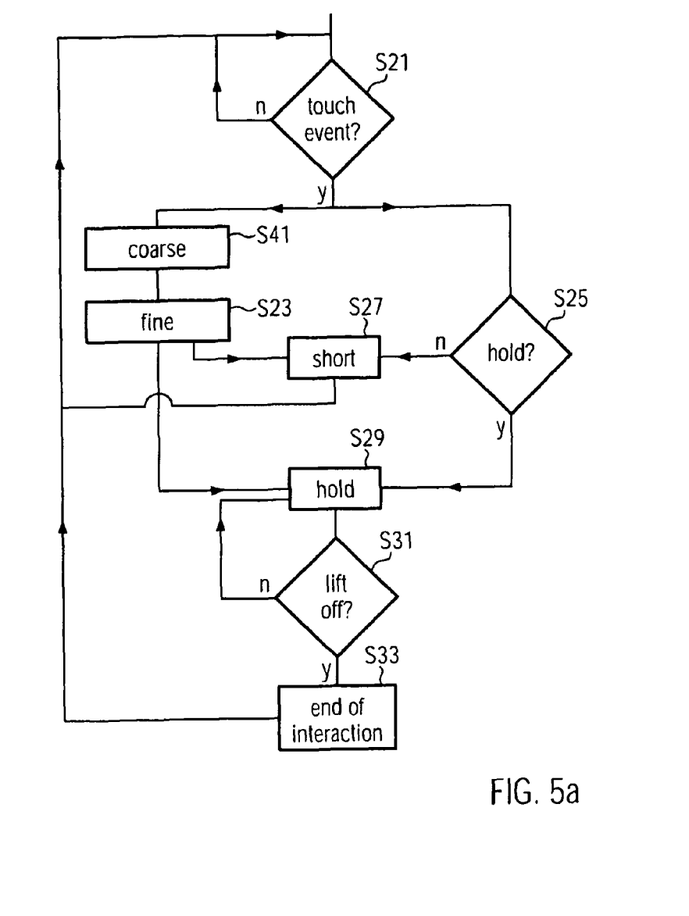
FIG. 5a illustrates a second embodiment of the inventive method to determine the location and duration of a sustained touch event, FIG. 5b schematically illustrates the concept of using a coarse and fine localization step.

FIG. 5a illustrates a second embodiment of the method according to the invention. Steps S21, S23, S25, S27, S29 and S31 correspond to the ones of the first embodiment. Their description will not be repeated in detail again, but it is referred back to the above detailed description.

In addition to the steps of the first embodiment, this method comprises a further step 41 which consists in a course location determination step, after a touch event has been identified in step S21. In step 41 a course candidate region, smaller in size than the interaction surface 3 itself, is determined within which the touch event took place based on the signal sensed by the second sensing means 11.

Then, during step S23, the precise location of the touch event is searched for only within the coarse candidate region.

Figure 5B:
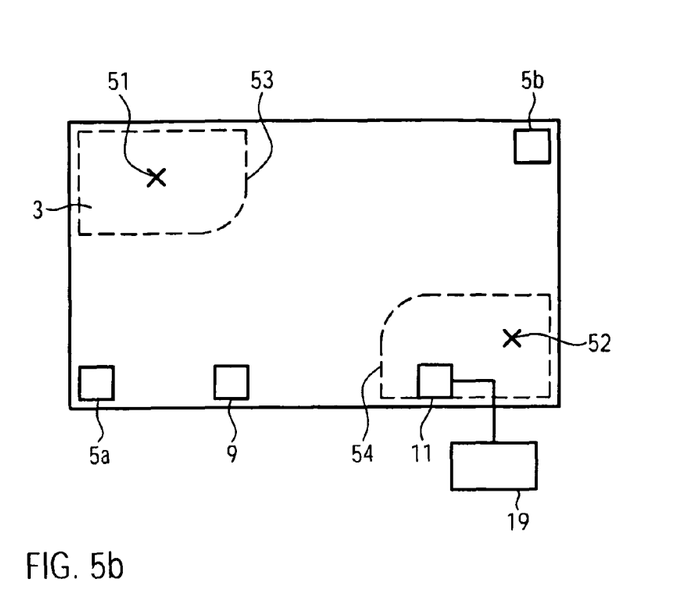

This situation is illustrated in FIG. 5b. It illustrates a top view of the user interface 3, the first sensing means with the piezoelectric sensors 5a and 5b, the transducer 9 to provide the active signal used in step S25 to decide whether there is a hold action or not, and the second sensing means 11. Indeed, depending on whether the impact is, for instance, positioned at location 51 or location 52, the second sensing means 11 will sense a two different signals For example a sustained touch at one location can be discriminated from a different location by looking at ratios of amplitude and/or of phase difference between various analysed natural frequencies or looking at the sign of the value obtained by subtracting the mean value from the observed one. Thus, the difference in the signals from the two locations can come from different vector shapes defined by the amplitude and/or phase of the disturbed signals.

Figure 5C:
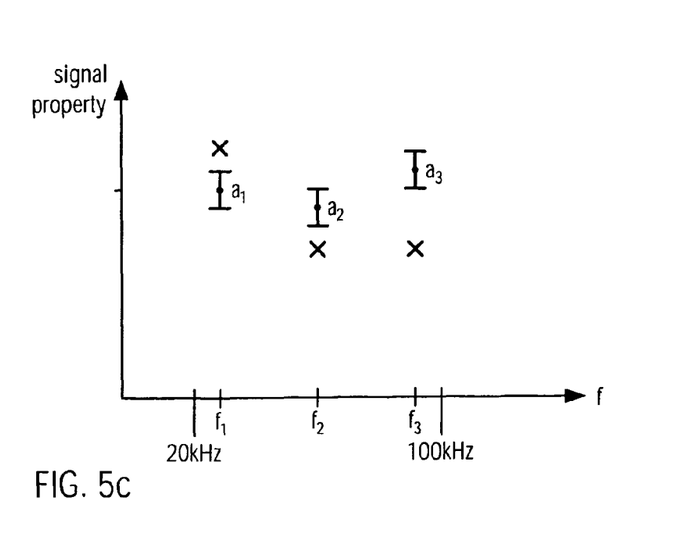
FIG. 5c illustrates the properties of the parameters of the perturbed signals in case the touch event takes place in a first region on the user interface
Figure 5D:
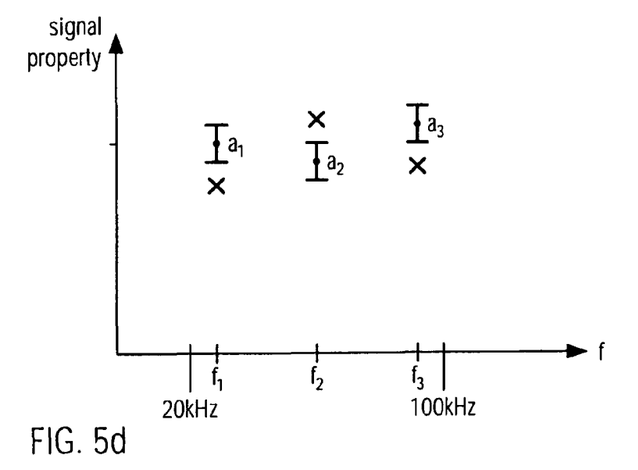
FIG. 5d illustrates the properties of the parameters of the perturbed signals in case the touch event takes place in a second region on the user interface.

FIGS. 5c and 5d illustrate this feature. FIG. 5c illustrates the effect of a touch on location 51 whereas FIG. 5d illustrates the effect of a touch on location 52. Whereas a touch on location 51 will move the parameter at frequency f1 above the maximum threshold value, a touch on location 52 will move the same parameter below the minimum threshold value. For the parameter at frequency f2 the situation is opposite, at location 51 the observed parameter is below and for location 52 the parameter above the threshold. For the third parameter the value moves for both locations below the lower threshold. Based on these observations, it is thus possible to create a look-up table which based on the observed perturbations indicates the coarse region where a touch event takes place.

Thus, depending of the observed perturbation of the generated signal, an additional analysing unit 19 will be able to determine a course region, e.g. represented by the dotted lines and reference numerals 53 or 54, within which the localization unit 7 can then determine the precise location of the touch event, here 51 and 52 respectively. Thus, the calculation power necessary to determine the precise location can be reduced.

This effect can furthermore be exploited to also identify multiple touch hold events. When two touch and hold events essentially take place at the same time or at least overlap in time, for instance a user touches at the same time touch location 51 and 52, the relative changes of the parameters a1, a2 and a3 can be exploited to identify the end of one of the two touch events.

Figure 5E:
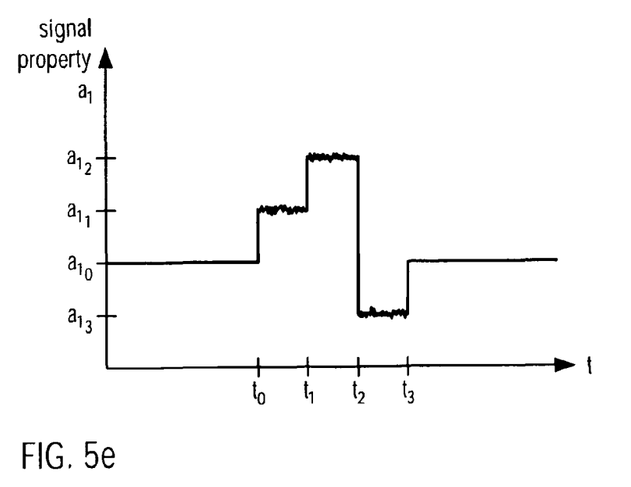
FIG. 5e illustrates the effect of a multi touch and hold event on the dependency of one parameter as a function of time.

FIG. 5*e* illustrates parameter al as a function of time. Until the first touch occurs at tO, the parameter a1 has its standard value $a1_0$, then a first sustained contact occurs at location 51 and the parameter al takes value $a1_1$, like illustrated in FIG. 5*c*. At t1 a second sustained contact occurs at location 52. Now two impacts perturb the signal generated by transducer 9 and the parameter a1 takes a new value $a1_2$. Then at t2, the user decides to remove his finger from location 51 and the value of the parameter takes value $a1_3$, which corresponds to the value illustrated in FIG. 5*d*. Based on the variations of the parameter observed at t2, and knowing from localization unit 7 that two impacts have been detected, the additional analysing unit 19 can identify that the touch event at location 51 has terminated at t2 and the touch event at location 52 still continues until t3.

Thus, by determining a look up table with the relationships between the various parameters for different locations, the inventive method can be extended to multiple touch and hold events. This approach is not limited to the use of natural frequencies and furthermore other kind of signals instead of generated acoustic signals could also be exploited in a similar way to achieve the multiple touch and hold functionality.

The location of two or more impacts can be determined by analyzing the acoustic bending waves created by the two impacts by known passive acoustic technologies.

Figure 6:
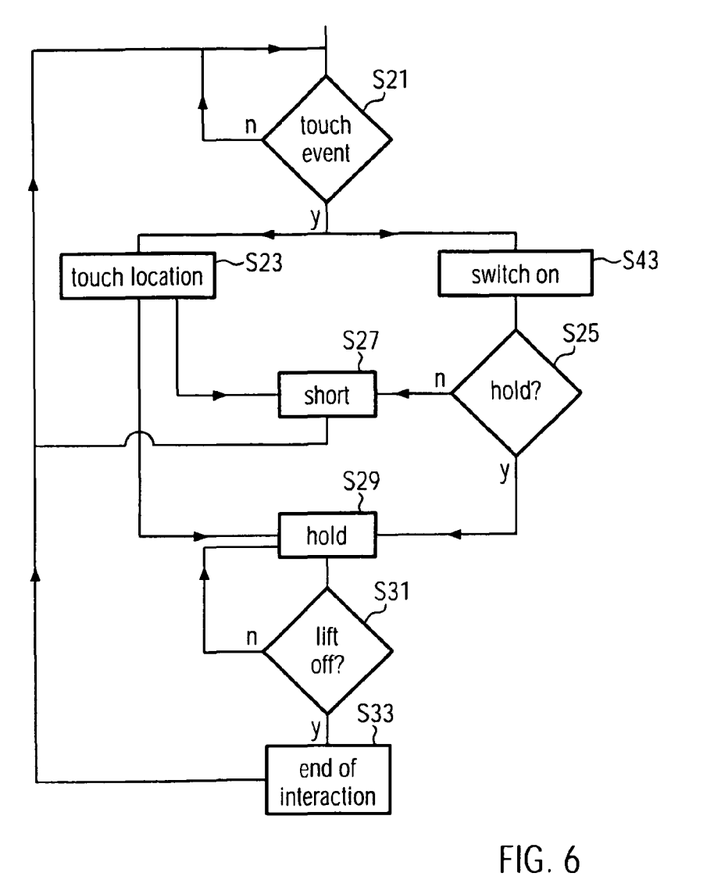
FIG. 6 illustrates a third embodiment of the inventive method to determine the location and duration of a sustained touch event.

FIG. 6 illustrates a third embodiment of the inventive method for which, steps S21, S23, S25, S27 and S31 are the same as in the first embodiment. Their description will not be repeated again but reference is made to the description of FIGS. 2 and 3. In contrast to the first embodiment, this method comprises an additional step S43 between steps S21 and S25 which consists in switching on the active part only upon the detection of a touch event in step S21. This has the advantage that energy consumption can be reduced without limiting the functionality. Indeed, the energy necessary to generate the signal used to determine the duration of touch event only has to be provided in case a touch event is detected. In particular, in hand-held mobile devices, this embodiment is therefore advantageous.

The inventive methods according to embodiments 2 and 3 can also be combined.

With the inventive device and the inventive methods it thus becomes possible to not only determine the location of an impact based on acoustic bending waves travelling inside the user interface 3, but one can also determine hold actions by actively generating a signal, the properties of which are analysed. By using natural frequencies to carry out the analysis, a hold and the lift-off action can be detected in a reliable manner and with reduced energy consumption.

The invention claimed is:

1. A method for determining the location and duration of a sustained contact of a touch event performed by a user on a surface of an object comprising:
    a) determining the location of the touch event, in particular based on an acoustic signal generated by the impact of the touch on the surface, and
    b) determining the duration of the touch event based on a perturbation of a signal generated in or on the object by a transducer, wherein determining the duration of the touch event comprises a calibration step, comprising sweeping through a frequency band provided by the transducer, and analyzing the signal generated at or close to N natural frequencies of the object, with N being one or more.

2. The method according to claim 1, wherein step a) comprises a coarse location determination based on the perturbation of the signal generated in or on the object and a fine location determination step based on the acoustic signal generated by the touch event.

3. The method according to claim 2, wherein during the coarse location determining step a candidate area smaller than the interaction surface is determined within which the touch event took place and wherein during the fine location determination step the location of the touch event is determined within the candidate area.

4. A method for determining the locations and durations of two or more sustained contacts of touch events performed by a user on a surface of an object, wherein the two or more sustained contacts at least partially overlap in time, the method comprising:
    a) determining the location of the touch events based on acoustic signals generated by the impacts of the touch on the surface, and
    b) determining the duration of each one of the sustained touch events based on sweeping through a frequency band provided by a transducer and the analysis of a signal of a second kind, wherein the end of one of the two or more sustained touch events is determined based on the identification of a change observed in at least one parameter of the signal of the second kind.

5. The method according to claim 1, wherein in step a) and b) different frequencies are analyzed.

6. The method according to claim 1, wherein in step b) the N frequencies used for analyzing are outside the audible frequency range, in particular at frequencies at or above 20 kHz.

7. The method according to claim 5, wherein the acoustic signal and the perturbed signal are sensed by the same sensing means.

8. The method according to claim 1, further comprising identifying the N frequencies used in step b) by identifying N largest signal amplitudes sensed by a sensing means.

9. The method according to claim 8, wherein the N frequencies used in step b) are separated by at least three times the frequency step used in the frequency sweep.

10. The method according to claim 1, further comprising a recalibration step, in particular carried out on a regular basis or upon user request, comprising sweeping through the frequency band which can be provided by the transducer, and adapting the N frequencies to be used in step b), in particular in case a frequency shift has been observed.

11. The method according to claim 8, wherein the calibration step further comprises:
    determining for each of the N natural frequencies, a mean value and a standard deviation of the amplitude and/or phase difference and/or inter sensed signal properties; and
    determining a minimum threshold value and a maximum threshold value for each corresponding frequency or a combination thereof.

12. The method according to claim 11, wherein in step b) it is decided that a touch action still occurs as long as at least one signal amplitude or phase or inter signal property of the N frequencies is outside the amplitude or phase or inter signal property range defined by the corresponding minimum and maximum threshold values respectively.

13. The method according to claim 12, wherein step b) further comprises determining a confidence level based on the number of amplitudes or phase or inter signal properties that is/are outside the amplitude or phase or inter signal property range.

14. A method for determining the location and duration of a sustained contact of a touch event performed by a user on a surface of an object, the method comprising:
   a) determining the location of the touch event based on an acoustic signal generated by the impact of the touch on the surface, and
   b) determining the duration of the touch event based on a perturbation of a signal generated in or on the object by a transducer, wherein determining the duration of the touch event comprises sensing the generated signal, sweeping through a frequency band provided by the transducer, and analyzing variations in the sensed signal.

15. Method according to claim 14, wherein in step b) the end of a touch event is detected in case the variations of the sensed signal are below a predetermined threshold.

16. Method according to claim 14, wherein in step b) the variations in the sensed signal are analyzed at or close to at least one frequency component at or close to a natural frequency of the object.

17. Computer program product for determining the location and duration of a sustained contact of a touch event performed by a user on a surface of an object, the computer program product comprising one or more non-transitory computer readable storage medium having computer-executable program instructions embodied therein for use with a computer, the computer-executable program instructions comprising instructions configured to cause:
   a) determining the location of the touch event, in particular based on an acoustic signal generated by the impact of the touch on the surface; and
   b) determining the duration of the touch event based on a perturbation of a signal generated in or on the object by a transducer, wherein determining the duration of the touch event comprises sweeping through a frequency band provided by the transducer and analyzing the signal at or close to N natural frequencies of the object, with N being one or more.

18. Touch sensitive device for determining the location and duration of a sustained contact of a touch event performed by a user on a surface of an object, the touch sensitive device comprising one touch location determining unit and one touch duration determining unit,
   wherein the touch location determining unit comprises a first sensing means for receiving an acoustic signal generated by the impact of the touch on the surface of the object and a localization unit for determining the location of the touch based on the acoustic signal, and
   wherein the touch duration determining unit comprises a transducer for generating a signal at or close to N natural frequencies of the object, with N being one or more, a second sensing means for receiving the generated signal and a duration determining unit for sweeping through a frequency band provided by the transducer and determining the duration of the touch based on a perturbation of the signal generated in or on the object by the transducer.

19. Touch sensitive device according to claim 18, wherein the first and the second sensing means share the same sensors and a filtering unit is used to attribute the signals to the localization unit and the duration determining unit based on the different frequencies used for the determining the localization and the duration.

20. The method according to claim 10, wherein the recalibration step further comprises:
   determining for each of the N natural frequencies, a mean value and a standard deviation of the amplitude and/or phase difference and/or inter sensed signal properties; and
   determining a minimum threshold value and a maximum threshold value for each corresponding frequency or a combination thereof.

21. The method according to claim 1, wherein step a) generates a passive signal and step b) generates an active signal and wherein the active signal is switched on in response to detecting the touch event.

22. The method according to claim 21, wherein the signal generated at or close to N natural frequencies is the active signal.

23. The method according to claim 1, wherein a passive signal is generated by the touch event performed by the user and wherein the passive signal amplitude is configured to remain at or above a minimum threshold value while energy consumption is configured to remain at or below a maximum threshold value.

* * * * *